Sept. 27, 1938.  H. F. SMITH  2,131,151
GRINDING MACHINE
Filed June 3, 1938  2 Sheets-Sheet 1
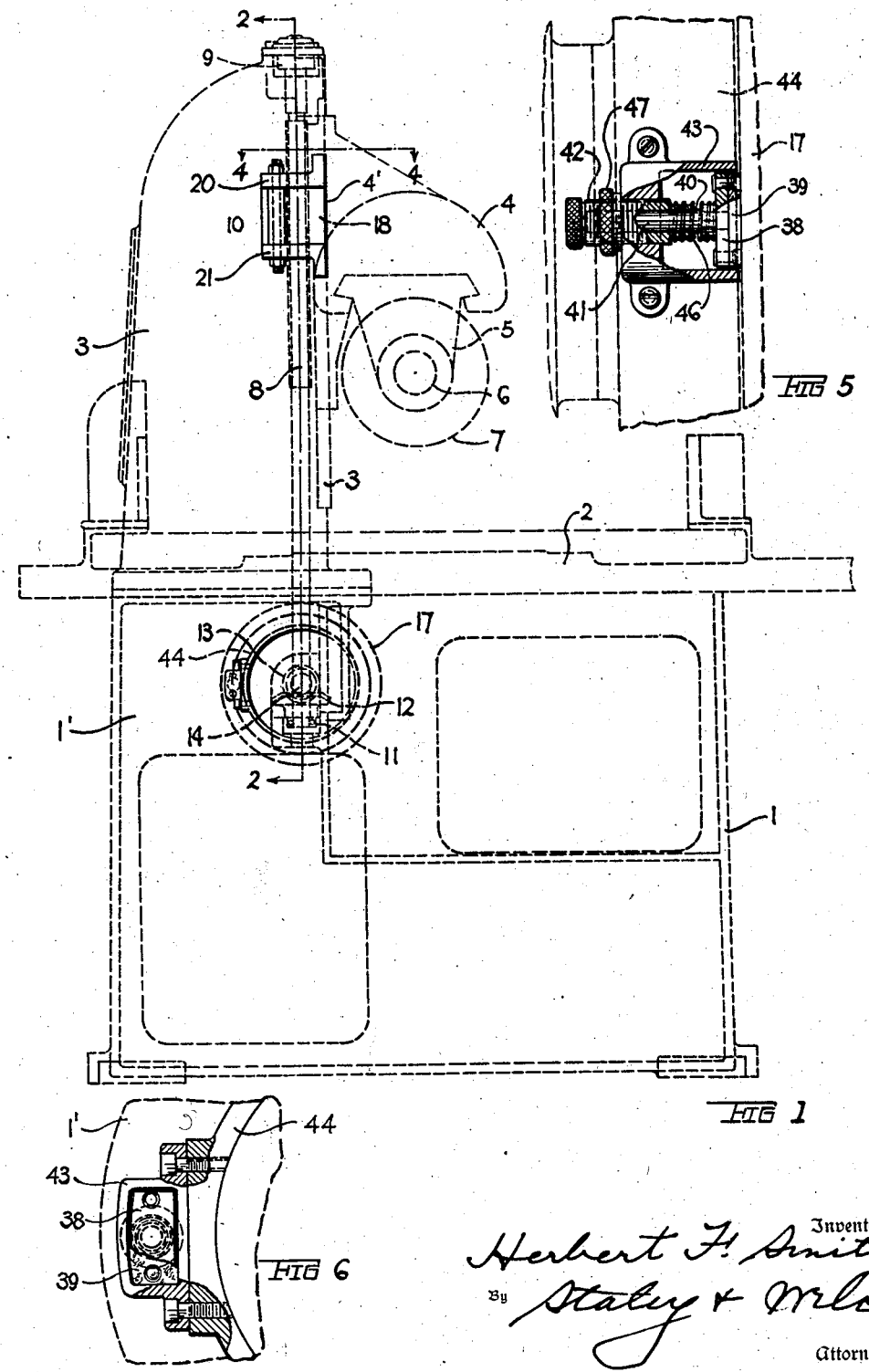
Herbert F. Smith Inventor
By Staley & Welch
Attorneys Sept. 27, 1938.  H. F. SMITH  2,131,151
GRINDING MACHINE
Filed June 3, 1938  2 Sheets-Sheet 2
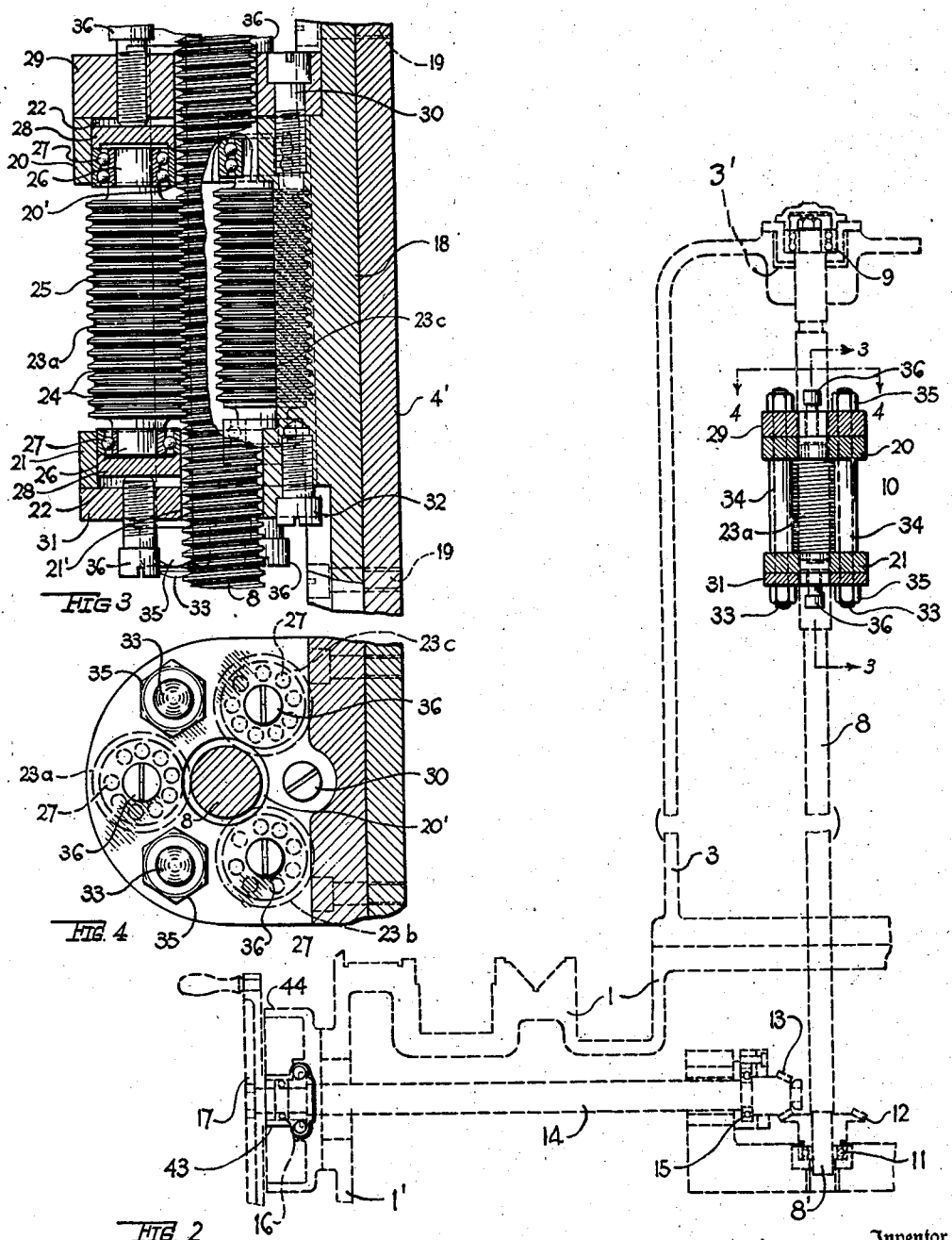

Patented Sept. 27, 1938

2,131,151

UNITED STATES PATENT OFFICE 2,131,151

GRINDING MACHINE

Herbert F. Smith, Springfield, Ohio

Application June 3, 1938, Serial No. 211,641

8 Claims. (Cl. 51—166)

This invention relates to improvements in screw and nut devices intended for the transformation of rotary motion to rectilinear movement, it more particularly relating to improvements in the nut for the purpose of reducing friction together with the introduction of a controllable friction-imparting device.

In all plain screw and nut devices, whether intended to elevate or lower a weight or to move a weight in any direction, approximately 60% to 75% of the power imparted to the screw is absorbed in overcoming the frictional resistance of the screw threads of the screw with those of the nut. This frictional resistance is the one thing that is relied upon in all bolt and nut devices to maintain parts in a bolted-together relation. Very often advantage is taken of this inherent frictional resistance as a sort of self-locking feature whereby an element such as a work table or a tool-head of a grinding machine may be retained at a given elevation without other locking devices. The resistance is not constant, however, depending on the state of lubrication of the parts and other causes such as varying loads applied to the movable part, and in the instance of machine tools where it is often desirable to indicate the amount of elevation or lowering by graduations on a part associated with the screw, such as a hand wheel, the readings are not an accurate index of the movement of the movable part, mainly due to the torsion of the rotary and partly to variations in the weights imposed on the threaded devices.

This invention is particularly adaptable to incorporation in machine tool design, and one of the objects of the invention is to so reduce the frictional resistance before mentioned as to eliminate to a great extent the angular variation in graduation readings due to torsion of the parts, both in elevation and lowering, more especially referring to lowering in connection with the descent of a tool-head when near or in contact with the work.

Another object of the invention is the provision of a controllable frictional resistance imparting device such as a brake to prevent "coasting" of the movable part. Since so little friction remains by the use of the improved nut, the self-locking feature disappears, and coasting may follow. Inasmuch as no special reliance could be placed on frictional resistance as a self-lock, due to the changeable nature of the resistance as previously mentioned, there is preferably provided instead a controllable device to act as a self-lock, and as a further object and advantage of the invention, to associate this brake device at such a point in connection with the parts involved as to set up no torsion in the parts due to overcoming the imposed, controllable frictional resistance. Further, where the brake has its effect is the point where its frictional resistance can be small, due to the high lever mechanical advantage, therefore, the brake can be small and of inexpensive design. The amount of resistance set up by the brake can be controlled or varied easily to make up for variations in the weight of the movable parts such as may occur when tools of varying weights are carried by the tool-head.

Another object and advantage is the obvious reduction in power required to operate the machine.

In the accompanying drawings:

Fig. 1 is a front elevation of a grinding machine in which devices embodying the principles of the invention are incorporated, those portions of the machine which are old in the art being shown in broken lines, while the novel features and adjacent machine surfaces are shown in full lines.

Fig. 2 is a fragmentary vertical section on the line 2—2 of Fig. 1, the same remarks as to broken and full line showings also applying to this view, the view being on a larger scale as compared to Fig. 1.

Fig. 3 is a view on a still larger scale, partly in elevation and partly in section, the section being taken on the line 3—3 of Fig. 2 an adjacent portion of the machine being herein shown in full lines.

Fig. 4 is an enlarged fragmentary section on the line 4—4 of Figs. 1 and 2.

Fig. 5 is an enlarged front elevation of the brake mechanism, the view being partly broken away to show interior parts in section.

Fig. 6 is a front elevation of the brake mechanism with portions broken away and shown in section.

In the present case the invention has been shown applied to a grinding machine, although not limited to that particular machine, and only those parts of a grinding machine necessary to illustrate the installation of the invention thereon will be described.

Referring to the drawings, 1 represents a base on which is slidably mounted for reciprocatory motion a work-table 2, the means for actuation of which is not shown in the present instance. A column 3 is attached to the base by means not shown, and on the column is slidably mounted for vertical travel thereon a saddle 4. As is customary with machines of the type shown, the saddle 4 supports a sliding wheel or tool head 5 arranged to slide transversely to the longitudinal travel of the work table 2, which is from left to right and vice versa in Fig. 1. The slide rotatably supports a spindle 6 which in turn carries an abrasive grinding wheel 7.

To elevate or lower the grinding wheel 7 from or toward the work-table is the function of the elevating mechanism now to be described. The saddle 4 is supported by a threaded screw 8 depending from a radial anti-frictional bearing 9, the inner race of which is attached to the screw and the outer race of which is supported in a recess 3' in the upper portion of the column 3, as shown in Fig. 2. The engagement of the screw with the saddle 4 is by means of the improved nut indicated in general at 10 attached to an adjacent portion 4' of the saddle 4. The specific construction of the nut 10 will appear later.

The lower end 8' of the screw 8 is inserted slidably in an anti-friction bearing 11 received in a suitable recess in the base 1, as shown in Fig. 2. On the lower end of the screw 8 is keyed a bevel gear 12 whose hub rests on the inner race of the bearing 11, and meshing with the gear 12 is a bevel pinion 13 secured to the inner end of a cross-shaft 14 suitably supported for rotation on anti-friction bearings 15 carried in the base 1 and anti-friction bearings 16 shown in dotted lines and located in a housing hereinafter referred to carried by the base. The outer end of the cross-shaft 15 projects through the forward wall 1' of the base 1, and on the outer end there is preferably secured a hand wheel 17. Preferably the ratio of the bevel-gearing just mentioned is of the nature of two to one, whereby the labor of the operator in raising the saddle is reduced.

It can be seen that in reducing the thickness of a piece of work held by any means on the work-table 2 by peripheral contact of the grinding wheel with the work, the grinding wheel 7 is successively let down toward the work, and the lowering of the wheel in certain very small amounts is of rather greater importance than the mere greater ease of operation in elevating the wheel.

To aid the operator in knowing within certain limits of tolerance just how far to lower the grinding wheel, there is preferably provided a series of equally divided graduations (not shown) on the periphery of the hand wheel 17. In reality, to get a good legible distance between graduations, the radius of the hand wheel 17 is often increased which increment is often effective in more readily setting up torsion in the cross shaft 14 and lower portion of the screw 8. By the use of the improved nut now to be described, the excessive thread friction of the screw and the usual plain nut is so much reduced as to enable the operator to retain the wide, easily read spacing and to know with greater certainty that the grinding wheel is actually being lowered an amount as represented by the graduations.

Referring now to Fig. 3, the nut is seen to consist of a main body portion 18 attached by screws 19 to the adjacent saddle portion 4' of the saddle 4. Standing at right angles to the body portion 18 is a pair of integrally attached ears, there being an upper, heavier ear 20 and a lower ear 21, having aligned openings 20' and 21', through which the screw 8 is inserted. The means for reducing the former objectionable thread friction consists of a plurality of coaxially aligned rolls rotatably supported by anti-friction radial bearings carried in the ears 20 and 21. To this end, a plurality of equally spaced, aligned openings 22, in parallel co-axial relation with the axis of rotation of the screw, are provided in the ears 20 and 21, and since in the present case three rolls are employed, there are three openings 22 in the upper ear 20 and three openings 22 in the lower ear 21.

The rolls 23a, 23b and 23c themselves are identical in the present instance, therefore in the description, one roll 23a only is treated, it being understood the same reference characters apply to any one of the three rolls. The outer cylindrical surface of each roll is grooved with peripheral straight parallel grooves 24, each groove being spaced apart from its neighboring groove a distance equal to the pitch of the threads of the screw 8 and a land 25 of the roll is a counterpart of the space between adjacent threads of the screw, and a groove 24 is a counterpart of the thread of the screw.

At each end of the roll 23a there is provided a reduced-diameter extended trunnion 26, and on each trunnion an anti-friction bearing 27 is fitted. These bearings 27 are inserted in the previously mentioned openings 22 which are bored to such size as to snugly receive the bearings.

In the assembly of the nut, each roll is inserted loosely in its place, in the present instance without having the bearings either in place on the rolls or in their respective bore, and preferably before the screw 8 is assembled into the machine. Each roll may be inserted loosely in place from the outside by inserting an end, say the upper end, into a bore cavity then lifting the roll to a sufficient height to allow the lower trunnion to pass over the inner face of the lower ear 21 so as to place the lower trunnion into its bearing bore. The bearings are then slipped into place in the bearing bores, while at the same time an adjacent trunnion is being received into the bore of the inner race, the bearing coming to a stop against a shoulder on the trunnion. A washer shown at 28 preferably having a shallow central recess in one side is then inserted in each bearing bore 22 against the bearing 27. The purpose of this washer will appear later.

The screw 8 is then threaded into the nut assembled thus far. A final adjustment is necessary involving endwise shifting of each roll because as might be inferred, each roll being identical, there will be a difference in the positioning of each roll with respect to each other due to the pitch of the thread on the screw. That is, taking the roll 23a (Fig. 3) as a basic roll and with a right hand screw as shown, the roll 23b will be shifted axially until it is one-third the pitch higher than the roll 23a, and in a similar manner the roll 23c will be one-third the pitch higher than the roll 23b or a total of two-thirds the pitch higher than 23a.

While the inward threading of the screw 8 brings about this shifting of the rolls automatically to a certain extent, provision is made for finer adjustment with a view to insuring that each roll will take its respective share of the load, the means also providing that such adjustments are permanently maintained.

For this purpose there is provided in the present instance a pair of overlying plates, one of which, indicated at 29 overlies the upper surface of the upper ear 20 and is partially secured to the nut body by the screw 30, while another plate 31 is secured in a similar manner adjacent the lower surface of the lower ear 21, a screw 32 being employed in the same manner as the screw 30. To provide greater rigidity and strength, comparatively long bolts 33 are passed through openings in ears and plates and through the bores of tubular spacing members 34 which, being the same length as the space between the inner faces of the ears, serve to prevent distortion when the nuts 35 are tightened.

The plates 29 and 31 overlie and close the outer ends of the bearing bores 22, and in those portions of the plates in alignment with the longitudinal axes of the rolls there are provided threaded openings into which adjusting screws 36 are threaded. On adjustment, each of the screws 36 make contact with an adjacent washer 28, which with its centrally-located recessed side placed toward a bearing 27 provides that the pressure of the screws 36 is imposed on the outer race of the corresponding bearing 27.

Therefore, it will be seen that by letting out a screw 36 positioned at one end of a roll 23 and turning in the similar screw 36 at the opposite end of the roll, the roll itself may be shifted axially, the bearings of the roll in question sliding in their bores to a like extent. With suitable gauges, each roll may be adjusted so as to be assured beforehand that each roll will in time take its proper share of the load imposed on the screw.

When the screw 8 is rotated as by hand manipulation of the hand wheel 17, it will be seen that the rolls 23a, 23b and 23c turn about their own axes due to the contact of the rolls with the screw, but with only a small amount of friction since the rolls are carried by the anti-friction bearings 27. In this way the thread friction incidental to plain nut and screw arrangements is practically eliminated. It will be understood that the rotation of the screw and rolls in either direction either elevates or lowers the saddle 4 and load carried thereby, which in the present case is the saddle, tool head and tool carried thereby.

With a machine of the type illustrated in the drawings, or in any machine in which a comparatively heavy part is elevated along a substantially vertical column such as the present column 3, the force of gravity tends to cause the part to descend, the undesirable descent being heretofore held in check by the thread friction, assistance in varying degree in preventing undesirable descent or coasting being provided by the inertia of the revoluble parts of the elevating mechanism.

In connection with the use of the improved nut it has been found in practice that in the general design of the machine it was impossible to provide that the same ratio of gearing be employed in all instances, therefore, the inertia of the revoluble parts varies, being large with a high ratio and vice versa. Undesirable descent or coasting could initiate itself from jars or vibrations from any source, to prevent which there is preferably employed a small controllable friction-imparting device or brake, making the same adjustable so that the degree of friction imposed can be varied accordingly as the inertia of the revoluble parts varies. Further, although the brake device may be located at any one of several points with reference to the revoluble elevation parts and the necessary amount of friction imposed at that point it is preferable to locate the brake device so as to apply the added friction to the hand wheel (preferably to the rear side thereof). This location is suitable for the reason that a change in the degree of friction may be quickly made, this being a desirable feature in view of a change in the weight of the part to be elevated, as when other tools are added to a tool head. Also, in view of the desirability of providing that graduations indicate very nearly the linear movements of the part being moved, the location at the hand wheel is preferable since in the present instance no part of the cross-shaft or screw is put in torsion in overcoming the small frictional resistance.

The frictional device employs a small flat plate 38 (Figs. 5 and 6) having a facing 39 preferably of a fibrous frictional material such as brake-lining secured to one side, and to the other (rear) side of the plate is fixed a cylindrical shank 40 adapted to act as a guide, the shank being slidably received in a bore 41 in a hollow exteriorly threaded adjusting screw 42. The screw 42 is threaded in an interiorly threaded opening in the rear wall of a small casing 43 secured to the outer peripheral surface of the housing 44 attached to the forward surface of the base 1, concentrically disposed with relation to the cross shaft 14 and carrying the forward bearing 16 heretofore referred to and supporting this end of the cross shaft 14. Between the forward end of the screw 42 and the rearward side of the plate 38 is interposed a coiled spring 46, which exerts pressure in greater or less degree on the frictional facing 39 on the rearward side of the hand wheel 17, the friction being varied by adjustably screwing in or out the screw 42. A lock nut 47 is employed to retain the screw 42 in any adjusted position.

Having thus described my invention, I claim:

1. In a screw operated raising and lowering mechanism, a weight supporting element, a screw, devices for rotating said screw, a series of grooved rolls supporting said element meshed with the threads of said screw together with anti-friction bearings between said element and rolls, and a friction brake for the revoluble parts.

2. In a grinding machine, a saddle, a grinding wheel supported by said saddle, a screw, devices for rotating said screw, a series of grooved rolls supporting said saddle meshed with the threads of said screw together with anti-friction bearings between said saddle and rolls, and a friction brake for the revoluble parts.

3. In a screw operated raising and lowering mechanism, a weight supporting element, a screw, devices for rotating said screw, a series of grooved rolls supporting said element meshed with the threads of said screw together with anti-friction bearings between said element and rolls, a friction brake for the revoluble parts, said friction brake comprising a shoe bearing upon a portion of the revoluble parts, a spring for pressing said shoe into frictional engagement with said parts, and means for adjusting the tension of said spring.

4. In a grinding machine, a saddle, a grinding wheel supported by said saddle, a screw, devices for rotating said screw, a series of grooved rolls supporting said saddle meshed with the threads of said screw together with anti-friction bearings between said saddle and rolls, a friction brake for the revoluble parts, said friction brake comprising a shoe bearing upon a portion of the revoluble parts, a spring for pressing said shoe into frictional engagement with said parts, and means for adjusting the tension of said spring.

5. In a screw operated raising and lowering mechanism, a weight supporting element having a pair of spaced ears, a screw passing loosely through said ears, devices for rotating said screw, a series of grooved rolls interposed between said ears meshed with the threads of said screw together with anti-friction bearings between said ears and rolls, and a friction brake for the revoluble parts.

6. In a grinding machine, a saddle having a pair of spaced-apart ears, a grinding wheel supported by said saddle, a screw passing loosely through said ears, devices for rotating said screw, a series of grooved rolls interposed between said ears meshed with the threads of said screw together with anti-friction bearings between said saddle and rolls, and a friction brake for the revoluble parts.

7. In a screw operated raising and lowering mechanism, a weight supporting element having a pair of spaced ears, a screw passing loosely through said ears, devices for rotating said screw, a series of grooved rolls interposed between said ears meshed with the threads of said screw together with anti-friction bearings between said ears and rolls, and a friction brake for the revoluble parts, said friction brake comprising a shoe bearing upon a portion of the revoluble parts, a spring for pressing said shoe into frictional engagement with said parts, and means for adjusting the tension of said spring.

8. In a grinding machine, a saddle having a pair of spaced-apart ears, a grinding wheel supported by said saddle, a screw passing loosely through said ears, devices for rotating said screw, a series of grooved rolls interposed between said ears meshed with the threads of said screw together with anti-friction bearings between said saddle and rolls, and a friction brake for the revoluble parts, said friction brake comprising a shoe bearing upon a portion of the revoluble parts, a spring for pressing said shoe into frictional engagement with said parts, and means for adjusting the tension of said spring.

HERBERT F. SMITH.